US005467526A

United States Patent [19]

Kunkel et al.

[11] Patent Number: 5,467,526

[45] Date of Patent: Nov. 21, 1995

[54] TOOL FOR WAFER ALIGNMENT AND INSERTION

[75] Inventors: Scott H. Kunkel, Centreville; Wiley M. Peck, Fairfax, both of Va.

[73] Assignee: E-Systems, Inc., Dallas, Tex.

[21] Appl. No.: 155,524

[22] Filed: Nov. 22, 1993

[51] Int. Cl.[6] .............................. H01R 43/22; B23P 19/04

[52] U.S. Cl. .............................. 29/747; 29/758; 29/759; 29/760

[58] Field of Search .............................. 29/747, 748, 750, 29/752, 754, 758, 759, 760; 81/487; 269/238, 254 R; 439/607, 608, 609, 610, 225

[56] References Cited

U.S. PATENT DOCUMENTS

| | | | |
|---|---|---|---|
| 2,349,956 | 5/1944 | Gliss et al. | 29/759 X |
| 3,317,989 | 5/1967 | Cull | 29/758 X |
| 3,435,389 | 3/1969 | Reinke et al. | 439/608 X |
| 3,824,670 | 7/1974 | Clark | 29/758 X |
| 4,375,719 | 3/1983 | Kent | 29/760 X |
| 4,717,190 | 1/1988 | Witherspoon . | |
| 4,932,900 | 6/1990 | Gliha | 439/608 |
| 4,941,700 | 7/1990 | Lin et al. . | |
| 5,040,484 | 8/1991 | Mears et al. | 269/254 R X |
| 5,181,859 | 1/1993 | Foreman et al. | 439/225 |

FOREIGN PATENT DOCUMENTS

| | | | |
|---|---|---|---|
| 596408 | 3/1978 | U.S.S.R. | 29/760 |

OTHER PUBLICATIONS

Grau, "Terminal Pin Aligning & Straightening Tool", Western Electric Tech. Digest No. 60, Oct. 1980, p. 11.

Faris, IBM Tech. Disclosure Bulletin, vol. 25, No. 11B, Apr. 1983, pp. 5931–5932.

*Primary Examiner*—Peter Vo

*Attorney, Agent, or Firm*—Rogers & Killeen

[57] ABSTRACT

A tool for i) aligning a bore pattern on a wafer with a corresponding pattern in a connector, and ii) maintaining the alignment of the wafer bore pattern and the connector pattern as the wafer is inserted into the connector.

15 Claims, 3 Drawing Sheets

TOOL FOR WAFER ALIGNMENT AND INSERTION

BACKGROUND OF THE INVENTION

The field of the invention relates to methods and tools for inserting wafers into connectors and more specifically for maintaining the alignment of the bores in a wafer with a corresponding pattern in a connector as the wafer is inserted into the connector.

Currently thin wafers constructed of delicate material are being inserted into electrical connectors to provide filtering and grounding functions. These wafers are typically shaped as thin disks and have holes or bores extending through them as shown in FIG. 1. The wafer bores are for receiving conductive pins that are part of a typical connector.

FIG. 1 shows a typical connector 52 and wafer 50 arrangement of the prior art where the connector has conductive pins 54 which may extend through the bores 56 in the wafer and into a mating connector 58 to make electrical contact with conductors in the mating connector. Such connectors 52 are typically constructed to have an internal structure from which the connector pins extend and a protective housing 60 surrounding the pins. The internal structure provides for the connection of the pins to a conductor leading from the connector (such as an insulated wire). The protective housing 60 shields the pins and internal structure from contact with things external to the housing.

In order for a wafer to provide a filtering or grounding function it is usually necessary that each of the connector pins make sufficient electrical contact with its corresponding wafer bore. In order to facilitate contact between the wafer and the pins, the wafer bores often have a diameter that is at most slightly smaller than the diameter of the pin to which the bore corresponds. The wafer bores may have small tabs within them defining the bore opening so that it is slightly smaller than the diameter of a single pin. Sufficient electrical contact between the pins and bores is made when the pins contact the small tabs and bend them in the direction of the pins passage through the wafer. The inherent properties of the wafer material cause the small tabs to be biased against the pins after being bent.

Wafers that are inserted into connectors may have an overall diameter that is substantially the same as the opening in the connector housing for receiving the wafer. When the wafer is inserted into the connector the edges of the wafer generally contact the sides of the housing. The wafer may bend and possibly break due to this contact if the insertion pressure is not applied across the entire surface of the wafer being inserted.

In one prior art method (shown in FIG. 1) of inserting a wafer with bores therethrough into a connector and onto internal connector pins, a wafer 50 is first carefully balanced at the entrance of the connector by hand. Next, the wafer is oriented so that the wafer bore hole pattern is aligned with the corresponding pin pattern in the connector 52. The wafer is then inserted into the connector by applying pressure to the wafer with a mating connector or plug 58. The wafer, being constructed of delicate material, may be damaged or destroyed if the bores and pins are not aligned and kept in alignment as the wafer is inserted or if the insertion pressure on the wafer is not applied evenly.

The connector housing by itself partially shields the connector pins from view and placement of the wafer at the connector entrance further shields the pins from view.

Accordingly alignment of the wafer bores with the connector pins is often difficult to obtain and/or maintain during the insertion process because of the inability to view the connector pin pattern prior to and during insertion.

Because the bores in the wafer may initially be misaligned or become misaligned during insertion, the pins may miss the bores and press into and damage the wafer. Since the pins are blocked from view by the wafer during insertion, verification of proper alignment between the bores and pins is limited prior to contact between the pins and the wafer.

Another difficulty often experienced using the prior art method is that the surface of a mating connector or plug which applies pressure to a wafer may be uneven. This uneven surface may cause the insertion pressure on the wafer to be applied unevenly, leading to cracking or breaking of the delicate wafer material.

It is accordingly, an object of the present invention to provide a novel means for and method of wafer insertion which overcomes these and other known problems of the prior art wafer insertion means and methods.

It is another object of the present invention to provide a novel means for and method of aligning the bores of a wafer with the pins of a connector and maintaining the alignment of the bores and pins while the wafer is being inserted onto the pins.

It is yet another object of the present invention to provide a novel means for and method of inserting a wafer into a connector by applying pressure to the wafer evenly across a surface of the wafer.

It is still another object of the present invention to provide a novel means for and a method of wafer insertion enabling a user to observe the alignment of the bores in a wafer with the pins in a connector as the wafer is inserted onto the pins of the connector.

It is a further object of the present invention to provide a novel means for and a method of straightening the pins of a connector.

It is still a further object of the present invention to provide a novel means for and method of aligning the bores of a wafer with the corresponding bores of a connector and maintaining the alignment of the two sets of bores while the wafer is being inserted into the connector.

These and many other objects and advantages will be readily apparent to one skilled in the art to which the invention pertains from a perusal of the claims and the following description of preferred embodiments when read in conjunction with the appended drawings.

DESCRIPTION OF PREFERRED EMBODIMENTS

Figure 1:
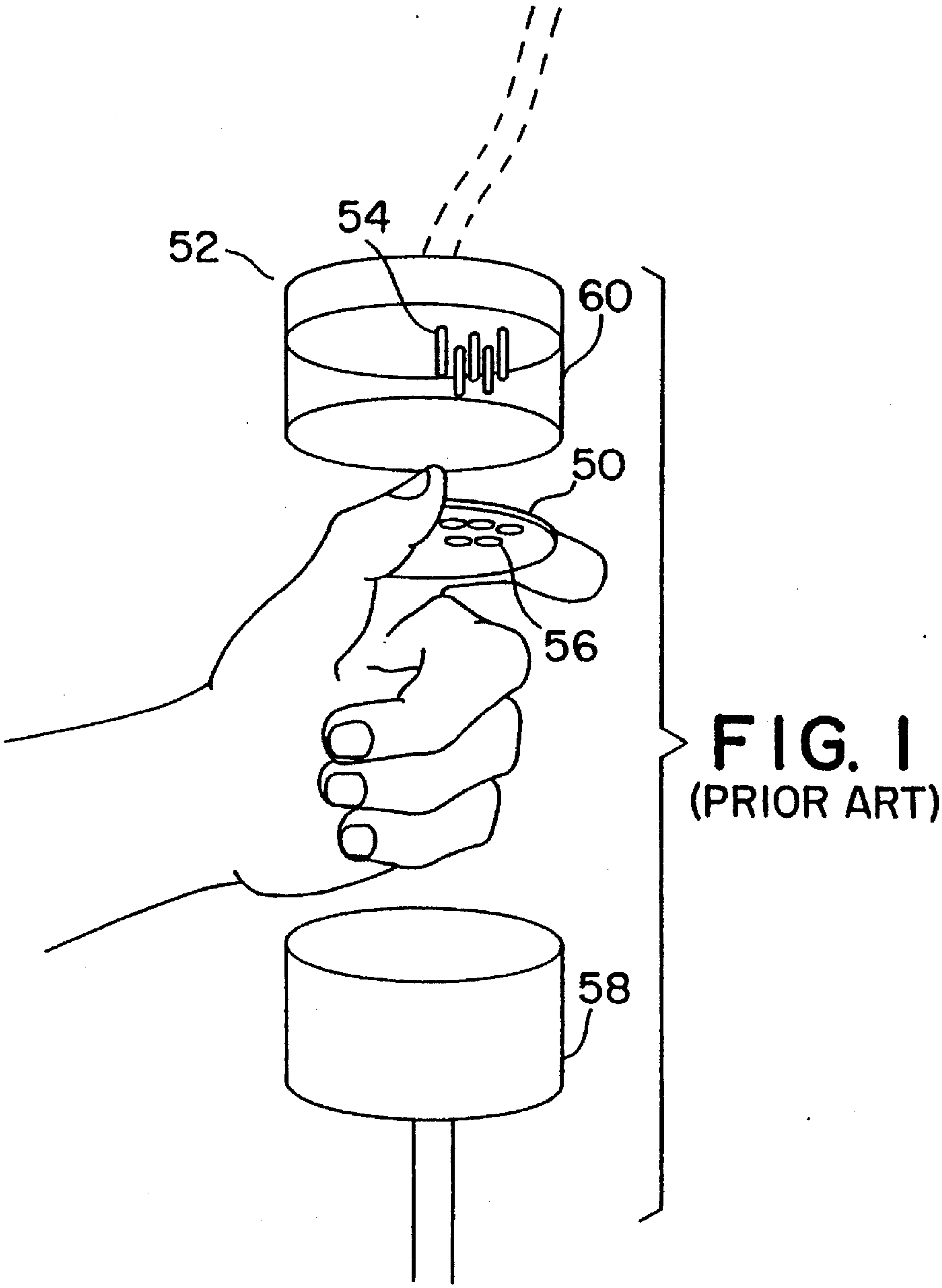
FIG. 1 (PRIOR ART)
FIG. 1 is a pictorial depiction of a prior art means for and method of wafer alignment and insertion into a connector.
Figure 2:
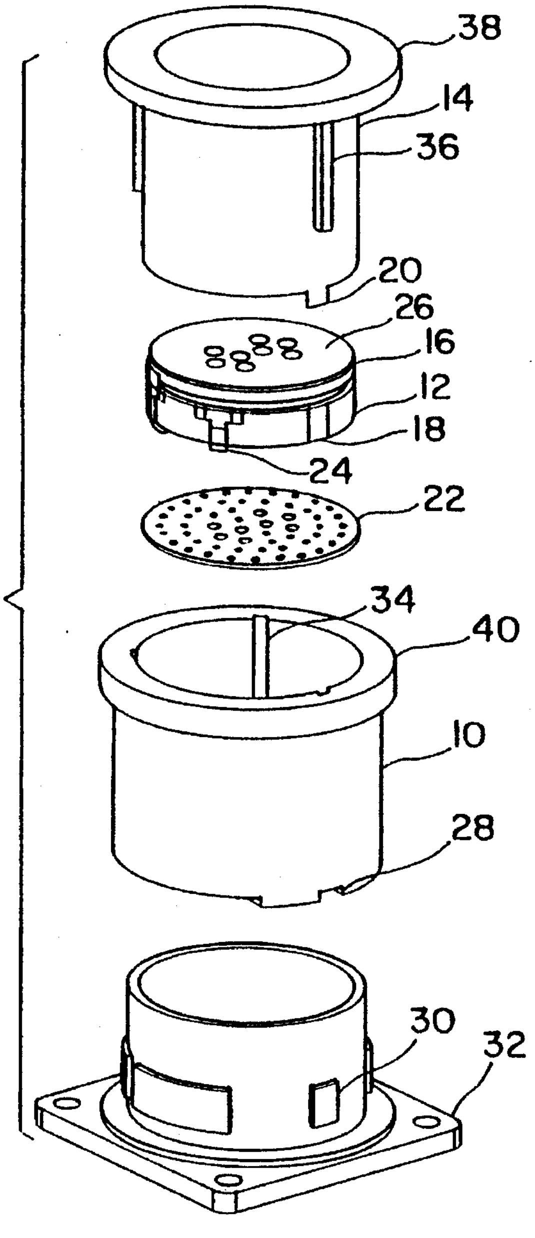
FIG. 2 is an exploded view of a tool in accordance with the present invention shown in relation to a wafer and a connector.

With reference to FIG. 2, the tool of a preferred embodiment of the present invention may have three portions, an alignment tube 10, a wafer retainer 12, and a wafer plunger 14.

The alignment tube 10 may have alignment tube features 28 on an inner wall, keyways 34 in the inner wall and a lip 40.

The wafer retainer 12 may have a transparent core member 26, a gasket ring 16 along an outer edge, a notch 18 in a side wall of the retainer, and a clip 24 extending from a connector facing end of the retainer.

The wafer plunger 14 may have keying blocks 36 extending from the side wall of the plunger and a planar surface 38 for receiving insertion and retraction forces on the plunger.

In operation, a wafer 22 may be inserted into and retained by the wafer retainer 12, as described below. Using the various keying features of the alignment tube 10, wafer retainer 12 and wafer plunger 14, the tool is first positively aligned with a connector 32. Subsequently, the plunger 14 is urged in the direction of the connector 32 which, in turn, urges the wafer 22 over the pins (not shown) of the connector 32. Once the wafer 22 is in place inside the connector 32, the wafer plunger 32 may be withdrawn and the entire tool removed, leaving the wafer 22 in place in the connector 32.

The alignment tube 10 may have alignment tube features 28 which extend from or reside in a wall of the alignment tube. The alignment tube features may be on an inner wall or an outer wall of the alignment tube depending upon the location of mating engagement features 30 of the connector 32. The alignment tube features 28 mate with the connector engagement features 30 and provide for the specific orientation of the alignment tube 10 relative to the connector 32 when the former is connected to the latter.

In the tool used with a standard type connector 32 shown in FIG. 2, where the engagement features 30 of the connector 32 are on an outer wall of the connector, the alignment tube 10 fits over the outer wall of the connector. The alignment tube features 28 are accordingly on an inner wall of the alignment tube 10 and the connector engagement features 30 are on an outer wall of the connector 32.

To reduce the complexity of the alignment tube and connector, the alignment features used in the present invention may use the same engagement features 30 for both engaging the alignment tube 10 and (when the alignment tube is not present) for mating with a plug (not shown) which is engaged with connector 32.

The alignment tube 10 may have a lip 40 at one end to facilitate placement and handling of the alignment tube 10.

With continued reference to FIG. 2, the alignment tube may also have one or more keyways 34 in the internal wall of the alignment tube. These keyways 34 are provided to mate with keying blocks 36 which extend from the side wall of the wafer plunger 14. The mating of the keying blocks 36 and keyways 34 provides for the specific orientation of the wafer plunger 14 with respect to the alignment tube 10.

The wafer plunger 14 may include a planar surface 38 for receiving insertion and retraction forces to be applied to the plunger. The shape of the planar surface 38 enables a user of the tool to push or pull on the plunger thereby moving the wafer retainer 12 into or out of the alignment tube 10 and connector 32.

The wafer retainer is aligned with the wafer plunger 14 by the prong 20 which extends from the connector facing end of the wafer plunger 14 and engages the notch 18 in the side wall of the wafer retainer.

One purpose of the wafer retainer 12 is to grasp and support the wafer 22. The wafer retainer 12 may have one or more clips 24 which extend from the connector facing end of the wafer retainer 12. The clips may be resiliently biased towards the wafer 22 in order to grasp the wafer securely (but without damage) at its edge. The connector facing end of the wafer retainer 12 is constructed to be substantially planar so that pressure applied by the wafer retainer 12 to the wafer 22 will be nearly uniform across the contact surface of the wafer 22.

The wafer retainer 12 may also have a transparent core member 26 which enables a view of the bore hole pattern in the wafer 22 so that the bore hole pattern may be aligned with a corresponding bore pattern in the core member 26. The bores in the core member 26 may be countersunk at the connector facing end of the core member to facilitate the entrance of connector pins into the bores when the wafer retainer 12 is inserted into the connector 32 without a wafer.

The transparent core member 26 also enables a view of the connector pins when the wafer retainer 12 is used alone (that is, without a wafer). The user may check the alignment of the wafer retainer bore pattern with the connector pins by sighting through the transparent core member 26. The user may even insert the wafer retainer 12 (without a wafer) into the connector 32 while sighting to further verify alignment and straighten the pins without the risk of ruining a wafer should alignment be faulty.

The alignment of the wafer 22 with the pins in the connector 32 is facilitated by a) aligning the alignment tube 10 with the connector 32, through the mating of the alignment tube features 28 with the connector engagement features 30, b) aligning the wafer plunger 14 with the alignment tube 10 through the mating of the keying blocks 36 with the keyways 34, c) aligning the wafer retainer 12 with the wafer plunger 14 by the engagement of the prong extending from the connector facing the end of the plunger with the notch in the side wall of the wafer retainer 12, and d) the aligning of the wafer 22 with the wafer retainer 12 by visually checking the alignment of the wafer retainer bores and the wafer bore hole pattern through the transparent core member 26 of the wafer retainer 12.

The individual portions of the tool are constructed such that proper assembly will result in the alignment of the wafer 22 with the connector pins 32. The tool is assembled and operated by connecting the wafer retainer 12 to the wafer plunger 14. The ring gasket 16 of the wafer retainer provides friction between the wafer retainer and the wafer plunger when the two are connected so that they stay connected when pressed together. The wafer plunger 14 and the wafer retainer 12 being connected together, a wafer 22 may be placed in the grasp of the wafer retainer 12. The wafer retainer 12 is then ready to be inserted through the alignment tube 10 to either deposit a wafer 22 into the connector 32 or straighten the connector pins.

The alignment tube 10 is then connected to the connector 32 and the wafer plunger 14 and wafer retainer 12 are inserted through the alignment tube 10 by applying pressure to the planar surface on the wafer plunger 14. During insertion the plunger keying blocks engage and mate with the alignment tube keyways 34.

A wafer that is inserted onto the pins of a connector 32 using the described tool or a method of the invention will remain in the connector 32 when the plunger and retainer are withdrawn due to the frictional forces exerted by the wafer bore walls on the connector pins. The frictional force of the retainer clips 24 on the wafer are less than the frictional force of the pins on the wafer bores.

Figure 3:
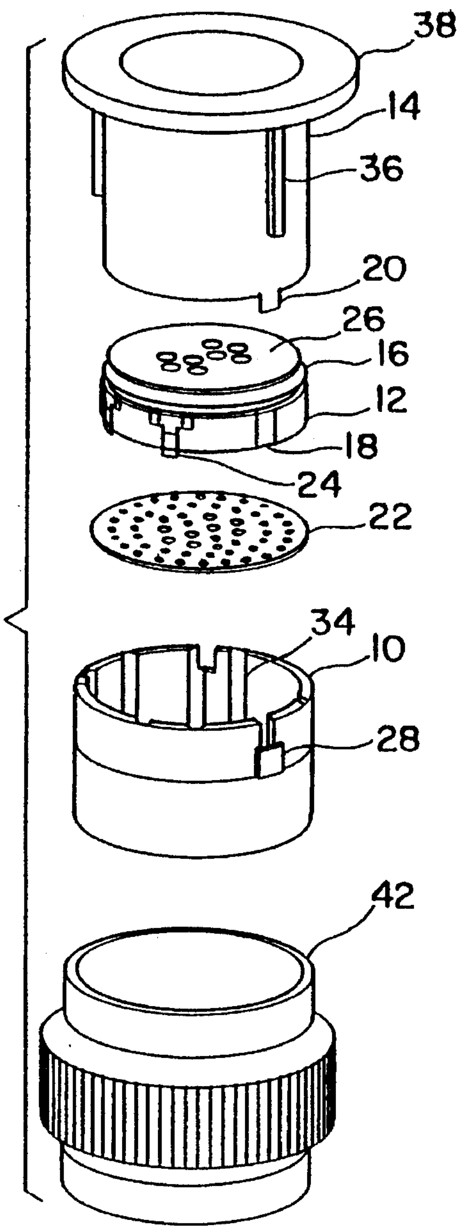
FIG. 3 is an exploded view of another tool in accordance with the present invention shown in relation to a wafer and a plug-type connector.

With reference to FIG. 3, where like elements have been given like numerical designations to facilitate an understanding of the present invention, a tool for use with a plug-type connector 42 which is in accordance with an alternative embodiment of the invention is shown. This tool utilizes an alignment tube 10 that fits inside of the inner wall of the plug-type connector 32, the alignment tube features 28 are accordingly on an outer wall of the alignment tube 10.

In another alternative embodiment of the invention, the tools of FIGS. 2 and 3 may be constructed so that the wafer retainer 12 and the wafer plunger are integral members of a single portion.

Figure 4:
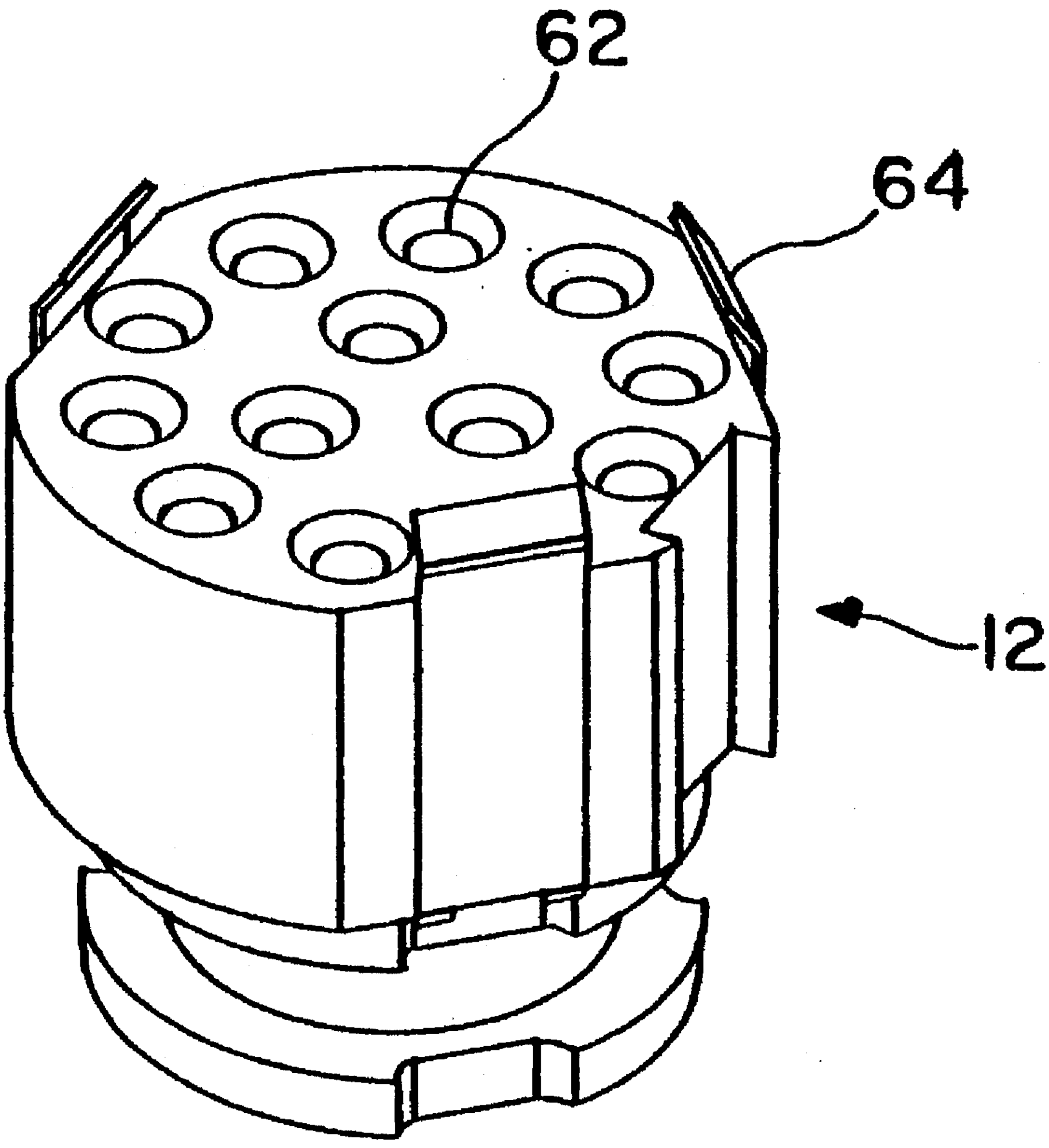
FIG. 4 is a pictorial representation of the detail of the wafer retainer of an embodiment of the invention.

FIG. 4 shows a wafer retainer 12 of another alternative embodiment of the invention. This wafer retainer 12 has countersunk bores 62 and three clips 64.

While preferred embodiments of the present invention have been described, it is to be understood that the embodiments described are illustrative only and the scope of the invention is to be defined solely by the appended claims when accorded a full range of equivalence, many variations and modifications naturally occurring to those skilled in the art from a perusal hereof.

What is claimed is:

1. An apparatus for inserting a wafer onto plural connector pins of a connector having a wall portion with engagement features extending therefrom comprising:

an alignment tube having a connector facing end, an opposing end and a side wall, said side wall having alignment tube features mateable with said connector wall engagement features;

a keyway in said alignment tube side wall;

a wafer plunger having a connector facing end, an opposing end and an external wall, said wafer plunger external wall carrying a keying block, said keying block being mateable with said keyway;

a planar surface for receiving force at the opposing end of said wafer plunger;

at least one prong extending from the connector facing end of said wafer plunger;

a wafer retainer having a plunger facing end and a connector facing end, and having a substantially transparent internal core member;

a notch in a wall portion of said wafer retainer, said notch being mateable with said prong for connecting said wafer retainer to said wafer plunger;

a plurality of bores in said internal core member extending from the connector facing end of said wafer retainer towards said plunger facing end;

two clips extending from the connector facing end of said wafer retainer, wherein a wafer is connectable to said wafer retainer by said clips; and wherein said wafer retainer and said wafer plunger are insertable into said alignment tube.

2. The apparatus of claim 1, wherein the apparatus is for, inserting a wafer having plural bores into a connector having plural bores and aligning said wafer bores with said connector bores, in lieu of inserting the wafer onto plural connector pins.

3. The apparatus of claim 1, wherein said side wall is an internal wall, said alignment tube features being carried by said internal wall.

4. The apparatus of claim 1, wherein said side wall is an external wall, said alignment tube features being carried by said external wall.

5. The apparatus of claim 1, wherein said connector wall engagement features are on an external portion of said connector wall portion.

6. The apparatus of claim 1, wherein said connector wall engagement features are on an internal portion of said connector wall portion.

7. The apparatus of claim 1, wherein said alignment tube and said wafer plunger are substantially cylinder shaped and said wafer retainer is substantially disk shaped.

8. The apparatus of claim 1 further comprising:

plural keyways in said alignment tube; and plural keying blocks on said wafer plunger, said keyways and keying blocks being spaced so that said wafer plunger is mateable with said alignment tube in only one orientation.

9. The apparatus of claim 1 further comprising: plural clips extending from the connector facing end of said wafer retainer, said clips being resiliently biased towards said internal core member.

10. The apparatus of claim 1, wherein each of said bores in said internal core member is countersunk at the connector facing end of said wafer retainer.

11. An apparatus for inserting a wafer onto plural connector pins of a connector having a wall portion with wall features extending therefrom comprising:

a hollow cylinder shaped alignment tube having a connector facing end, an opposing end and a side wall;

alignment tube features in said alignment tube side wall, said alignment tube features being mateable with said connector wall features;

plural keyways in said alignment tube side wall;

a circular lip at the opposing end of said alignment tube;

a hollow right cylinder shaped wafer plunger having a connector facing end, an opposing end and an external wall, said wafer plunger external wall carrying plural keying blocks, said keying blocks being mateable with said keyways, said keyways and keying blocks being spaced so that said wafer plunger is mateable with said alignment tube in only one orientation;

a ring shaped planar surface for receiving force at the opposing end of said wafer plunger;

at least one prong extending from the connector facing end of said wafer plunger;

a disk shaped wafer retainer having a plunger facing end and a connector facing end;

a substantially transparent and planar internal core member in said wafer retainer;

an external ring member surrounding said internal core member;

a notch in a wall portion of said external ring member, said notch being mateable with said prong for connecting said wafer retainer to said wafer plunger;

a plurality of bores in said internal core member extending from the connector facing end of said wafer retainer towards said plunger facing end;

plural clips extending from the connector facing end of said wafer retainer, said clips being resiliently biased towards said internal core member; and wherein said wafer retainer and said wafer plunger are insertable into said alignment tube.

12. A three piece apparatus for inserting a thin, flat wafer having plural connector pin apertures arranged in a predetermined pin pattern into a plural pin connector in which the pins are arranged in the same predetermined pin pattern comprising:

(1) a first piece comprising wafer retaining means including:

(a) a flat surface adapted to contact the wafer to be inserted, said flat surface having plural connector pin apertures, arranged in the predetermined pin pattern of the connector into which the wafer is to be inserted, and (b) plural wafer edge contacting means for engaging the edge of a wafer when the wafer is in contact with said flat surface of the wafer retaining means with the apertures of the wafer to be inserted being in alignment with apertures in said flat surface;

(2) a second piece comprising means for carrying said first piece in a unique alignment therewith; and (3) a third piece comprising:

(a) means to removably mate said third piece with a connector into which the wafer is to be inserted in a unique alignment with respect to the connector, and (b) means for slidably receiving said second piece in a unique alignment therewith, the sliding movement of said second piece, and thus said first piece, in said third piece effects the insertion of a wafer when carried by said first piece into a connector with which said third piece is aligned with the apertures in the wafer aligned with the pins of the connector assured by the unique alignment of said three pieces.

13. The apparatus of claim 12 wherein said first piece includes an optically clear portion for observing the alignment of the apertures in a wafer when carried thereby relative to the pin pattern of the connector to which said third piece is mated said second piece is slidably received in said third piece.

14. The apparatus of claim 13 wherein said optically clear portion includes said flat surface.

15. The apparatus of claim 12 wherein said plural wafer edge contacting means includes three equally spaced resilient clips.

* * * * *